Jan. 11, 1927.
H. C. SCHAPER
1,614,086
CHILD'S VEHICLE
Filed Jan. 28, 1925 3 Sheets-Sheet 1
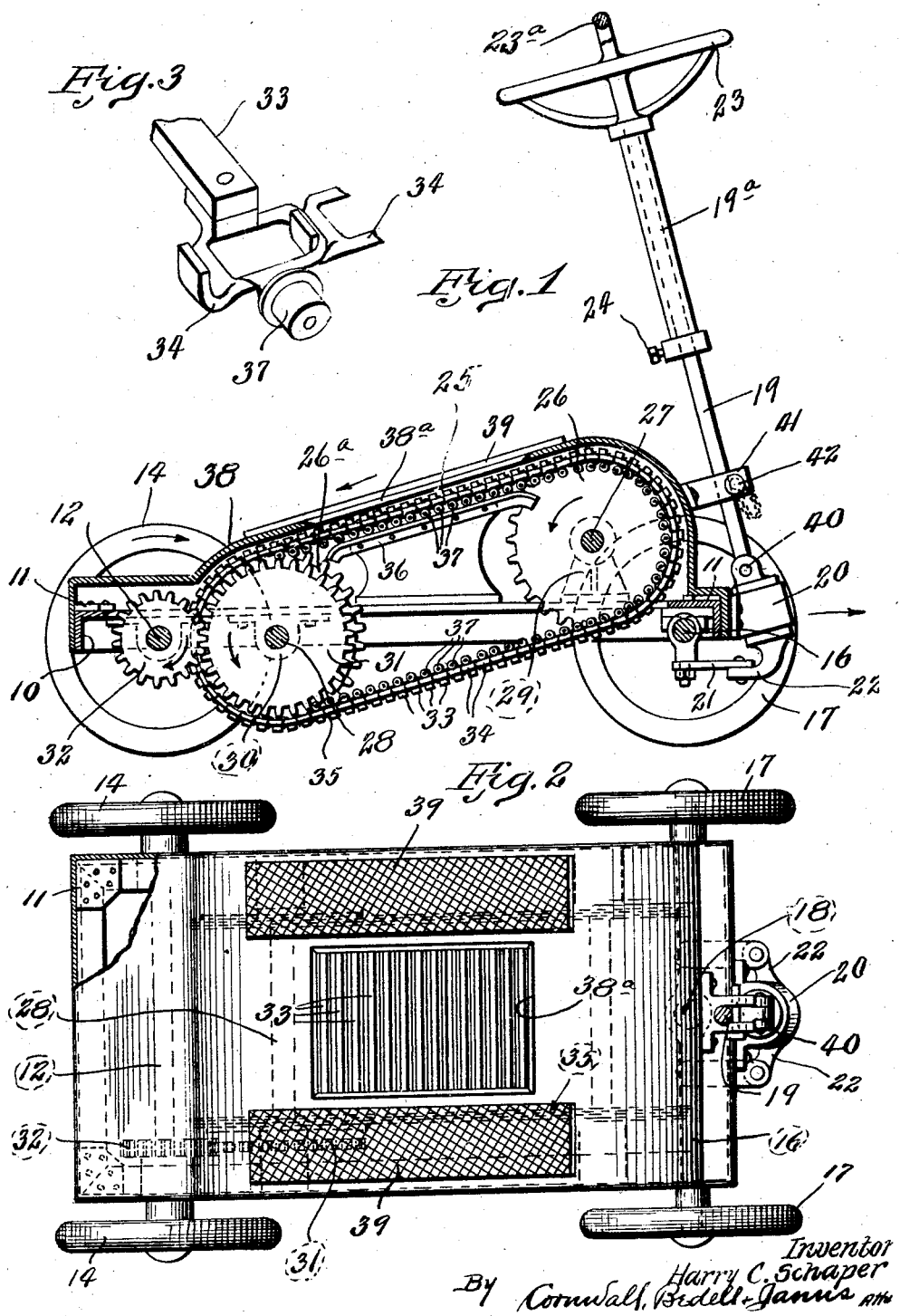
Inventor
Harry C. Schaper
By Cornwall, Bidell+Janus Attys

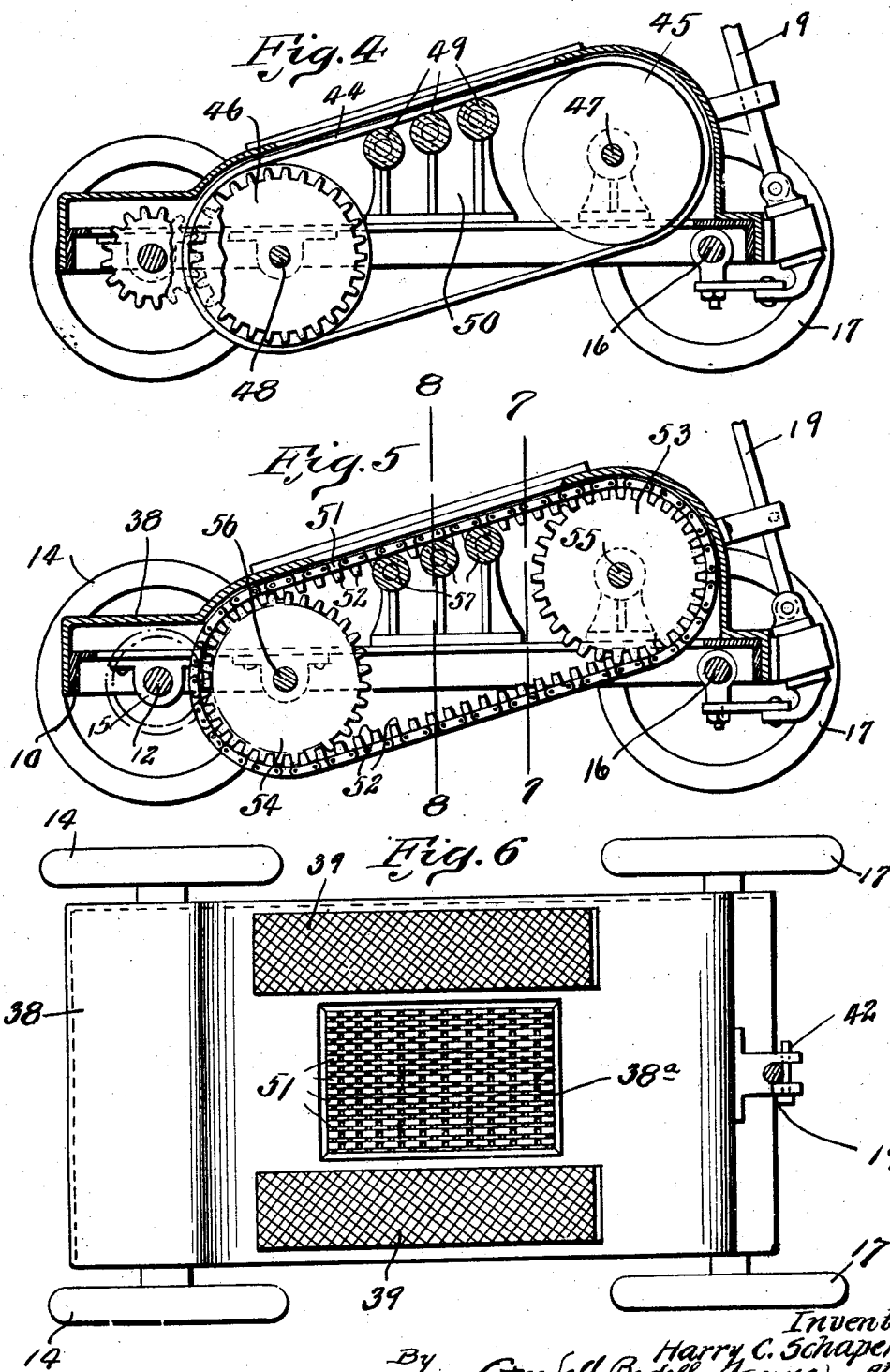

Jan. 11, 1927.  
H. C. SCHAPER  
CHILD'S VEHICLE  
Filed Jan. 28, 1925

Inventor  
Harry C. Schaper  
By Cornwall, Birdell & Janus  
Att'ys

Patented Jan. 11, 1927.

1,614,086

UNITED STATES PATENT OFFICE.

HARRY C. SCHAPER, OF ST. LOUIS, MISSOURI.

CHILD'S VEHICLE.

Application filed January 28, 1925. Serial No. 5,264.

This invention relates to new and useful improvements in children's vehicles, the objects being to provide a vehicle which is simple but of durable construction and adapted to be driven by means of a movable platform which is actuated by the occupant walking or running up said platform.

Further objects of the invention are to provide a vehicle having a movable platform in the form of an endless belt or conveyor, which forms the floor for supporting an operator and which is adapted to be operated by him to actuate suitable mechanism for driving the rear axle of the vehicle.

With these and other objects in view, my invention consists in certain novel features of construction and arrangement of parts, hereinafter more fully described and claimed, and illustrated in the accompanying drawings, in which—

Figure 1 is a longitudinal vertical cross section taken through the vehicle.

Figure 2 is a top plan view of the same.

Figure 3 is a perspective detail view of one of the chain links utilized in the construction of the platform.

Figure 4 is a longitudinal cross section through a modified form of vehicle.

Figure 5 is a longitudinal cross sectional view of another modified form.

Figure 6 is a top plan view of the vehicle shown in Figure 5.

Figure 7:
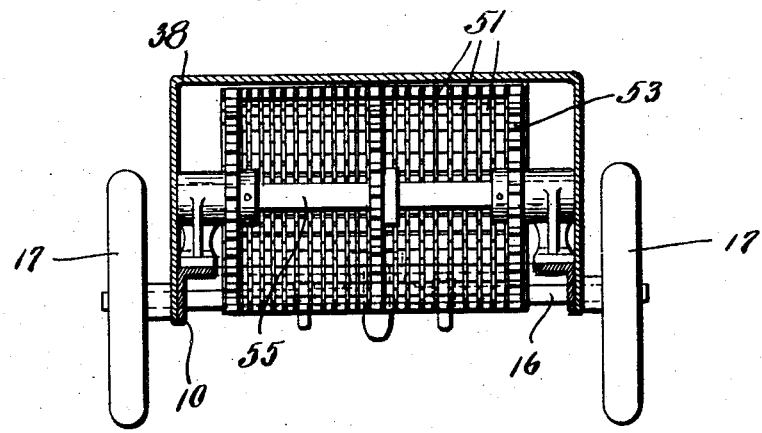
Figure 7 is a vertical cross section taken on lines 7—7 of Figure 5.

Referring by numerals to the accompanying drawings, 10 indicates the frame of a vehicle, said frame being preferably constructed of angle iron reinforced at the corners by gusset plates 11. A rear axle 12 having wheels 14, preferably rubber-tired, is journaled in bearings 15 supported on frame 10. A front axle 16 having wheels 17, also rubber-tired, is pivotally mounted at 18 on frame 10 and is steered by a steering column 19 which is supported at its lower end in a bearing 20 and is connected to axle 16 by links 21 and arms 22. The upper end $19^a$ of said steering column carries a steering wheel 23 and is adjustable longitudinally in order to bring the wheel to the desired height. A screw 24 locks the extensible end $19^a$ in adjusted position.

The vehicle is driven by means of an endless belt or platform 25 which operates over pulleys or drums 26 and $26^a$ carried by shafts 27 and 28, respectively. Shaft 27 carrying pulley 26 is journaled in bearings 29 carried by the front end of the frame 10 and extending a suitable distance upwardly therefrom. Shaft 28 is journaled in bearings 30 disposed preferably within frame 10. Thus the belt or movable platform 25 is inclined downwardly and rearwardly and the weight of a person standing thereon will cause it to move rearwardly, thereby setting in operation shafts 27 and 28. Shaft 28 has fixed thereto a gear 31 which meshes with a pinion 32 fixed to the rear axle 12 so that when shaft 28 is operated, said axle will be driven in the direction indicated by the arrow, causing the rear wheels to revolve and move the vehicle forward.

In the preferred form shown in Figures 1 to 3, the movable platform 25 consists of slats 33 extending transversely of the vehicle, having their ends fastened to links 34 of chains 35 which operate over wheels 26 or $26^a$ which in the present instance are in the form of sprocket wheels. To form a rigid support for the chains and the slats at the point at which the driver stands, a track 36 is arranged on each side of frame 10 and extends upwardly a suitable distance and operating over this track are rollers 37 carried by each link 34. A cover plate or stationary platform 38 is fixed to frame 10 and encloses the mechanism just described and is provided in its inclined portion with an opening $38^a$ through which the movable platform is exposed. The portions adjacent to each side of the opening $38^a$ are provided with plates or raised portions 39, the surface of which is roughened or otherwise formed in order to provide a secure footing for the driver when not operating the movable platform.

Steering column or rod 19 is preferably provided with a pivotal joint as indicated at 40 which is located immediately above bearing 20 and permits the steering column to be dropped downwardly so that it may be used as a wagon tongue. The steering wheel 23 is provided with an extension $23^a$ which forms a suitable handle for the steering column when used as a wagon tongue. To steady the steering column and lock it in its upright position, a block 41 having a bifurcated end is fixed to cover 38 and receives said column 19. A removable pin 42 is seated in the upper end of block 41 and locks steering column 19 in position.

In the modified form shown in Figure 4, the platform consists of a comparatively wide belt 44 which operates over pulleys or drums 45 and 46 of shafts 47 and 48, respectively. A series of rollers 49 is arranged in suitable bearings 50 and extend transversely of the belt 44 immediately below opening 38ª and form a support therefor.

Figure 8:
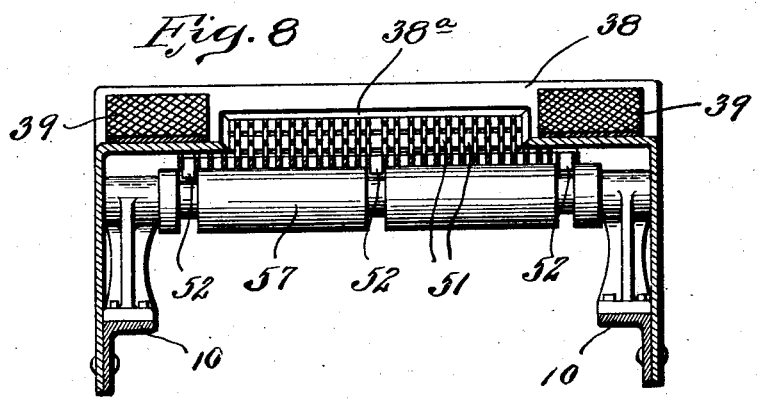
Figure 8 is a vertical cross section taken on lines 8—8 of Figure 5.
Figure 9:
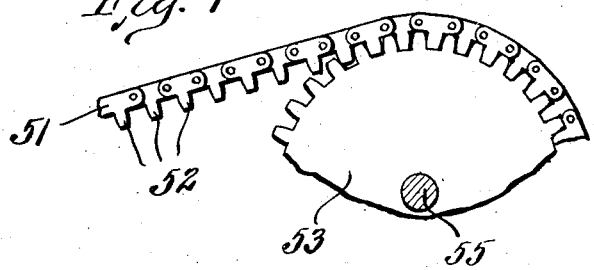
Figure 9 is a fragmental detail view of one of the chain gears and the platform operating thereover.

In the form shown in Figures 5 to 9, another modified form of the vehicle is disclosed wherein the movable platform consists of a chain 51, certain links of which are provided with teeth 52 which are adapted to mesh with gears 53 and 54 of shafts 55 and 56, respectively. A series of rollers 57 arranged near the chain immediately below the opening in the cover form auxiliary supports for the chain.

While I have shown the preferred form of steering mechanism, other forms may be used, if desired.

The operating mechanism of the vehicle is completely enclosed so that all danger of injury to the operator from said mechanism is entirely eliminated. The vehicle is safe to operate, the movable platform being disposed in close proximity to the stationary platform, and the lower receiving edge formed by providing an opening in said stationary platform is beveled so as to readily receive the operator should the latter remain standing on the platform.

I claim:

1. A vehicle of the class described comprising a frame, axles carried by said frame, wheels fixed on said axles, a shaft journaled in said frame near one of said axles and in operative engagement therewith, bearings extending upwardly from said frame adjacent to the front axle, a shaft journaled in said bearings above said frame and an endless flexible member operatively mounted on said shafts and forming a movable platform adapted to be actuated by the driver for driving said shafts and said axle.

2. A vehicle comprising a wheeled chassis including axles, a pair of shafts journaled in said chassis at different levels, one of said shafts being disposed below the top of said chassis and the other shaft being arranged above the same, driving mechanism interconnecting one of said axles with the lower one of said shafts, and an endless flexible member operating over said shafts and disposed at an angle to the horizontal plane and to said chassis, thereby forming a movable platform adapted to be actuated by the driver for operating said driving mechanism.

3. A vehicle comprising a wheeled chassis including axles, a pair of shafts journaled in said chassis, one of said shafts being disposed above said chassis, bearings extending from said chassis for supporting said shaft, driving mechanism interconnecting one of said axles with the lower one of said shafts, wheels fixed to said shafts, and an endless flexible member operating over said wheels and disposed at an angle to the horizontal plane, thereby forming a movable platform adapted to support and be operated by the driver for actuating said driving mechanism.

4. A vehicle comprising a wheeled chassis including axles, a pair of shafts journaled in said chassis, one of said shafts being disposed above said chassis, bearings secured and extending upwardly from said chassis for supporting said upward shaft, driving mechanism interconnecting one of said axles with the lower one of said shafts, wheels fixed to said shafts, an endless flexible member operating over said wheels and disposed at an angle to the horizontal plane, thereby forming a movable platform adapted to support and be operated by the driver for actuating said driving mechanism, and a stationary platform fixed to said chassis and enclosing said mechanism, said platform being provided with an upwardly and angularly disposed portion having an opening through which a portion of said movable platform is exposed for supporting the driver.

5. A vehicle comprising a wheeled chassis including axles, a pair of shafts journaled in said chassis, one of said shafts being journaled in said chassis adjacent to the rear axle and the other one of said shafts being disposed above said chassis adjacent to the front axle, and bearings fixed to and extending upwardly from said chassis for supporting the last mentioned shaft, driving mechanism interconnecting the rear axle with one of said shafts, wheels fixed to said shafts, an endless flexible member operating over said wheels and disposed at an angle to the horizontal plane and to said chassis, thereby forming a movable platform adapted to support and be operated by the driver for actuating said driving mechanism, and means supported on and extending above said frame and engaging said platform for reinforcing the same against the weight of the driver.

6. A vehicle comprising a frame, axles carried by said frame, wheels on said axles, a pair of shafts journaled on said frame, one of said shafts being disposed below the top of said frame and the other one of said shafts being arranged above said frame, driving means interconnecting the lower one of said shafts with one of said axles, sprocket wheels carried by said shafts, sprocket chains operating over said wheels, slats extending transversely of the vehicle and having their ends secured to the links of said sprocket chains for forming a movable platform adapted to be engaged and actuated by the driver, thereby actuating said vehicle, rollers secured to and extending laterally from the links of said sprocket chains, and stationary tracks supported by and extending upwardly from said frame and adapted to be engaged by said rollers for reinforcing the upper half of said movable platform at points intermediate said shafts.

7. A vehicle comprising a frame, axles carried by said frame, wheels on said axles, a pair of shafts journaled on said frame, driving means interconnecting one of said shafts with one of said axles, sprocket wheels carried by said shafts, sprocket chains operating over said wheels, slats extending transversely of the vehicle and having their ends secured to the links of said sprocket chains for forming a movable platform adapted to be engaged and actuated by the driver, thereby actuating said vehicle, rollers carried by said sprocket chains, stationary tracks supported by and extending upwardly from said frame and adapted to be engaged by said rollers for forming a rigid support for said movable platform at points intermediate said shafts, and a shell fixed to and extending upwardly from said frame for enclosing said mechanism and forming a stationary platform, said shell being provided in its upper face with an opening through which a portion of said movable platform is exposed.

8. A vehicle of the class described comprising a body frame, an axle journaled therein, wheels on said axle, a pair of shafts journaled on said frame, one of said shafts being journaled above said frame, an endless flexible platform operatively mounted on said shafts and disposed at an angle to said body frame thereby being adapted to be set in operation by the operator walking on said platform, driving connections between said axle and one of said shafts for driving said vehicle by the actuation of said platform, steering means for said vehicle and a housing enclosing the top and sides of said frame and provided with a raised portion inclined from horizontal for accommodating said endless platform and the mechanism associated therewith, there being an opening formed in said raised portion through which said platform is exposed, and tread plates on said housing arranged on each side of said opening.

In testimony whereof I hereunto affix my signature this 23rd day of January, 1925.

HARRY C. SCHAPER.